US010413983B2

(12) United States Patent
Lynch et al.

(10) Patent No.: US 10,413,983 B2
(45) Date of Patent: Sep. 17, 2019

(54) METHOD FOR ELECTROCHEMICAL MACHINING OF COMPLEX INTERNAL ADDITIVELY MANUFACTURED SURFACES

(71) Applicant: United Technologies Corporation, Farmington, CT (US)

(72) Inventors: Matthew E. Lynch, Canton, CT (US); Wendell V. Twelves, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 31 days.

(21) Appl. No.: 15/785,892

(22) Filed: Oct. 17, 2017

(65) Prior Publication Data

US 2019/0111507 A1    Apr. 18, 2019

(51) Int. Cl.
| *B23H 3/04* | (2006.01) |
| *B23H 7/32* | (2006.01) |
| *B23H 7/26* | (2006.01) |

(52) U.S. Cl.
CPC ............ *B23H 3/04* (2013.01); *B23H 7/26* (2013.01); *B23H 7/32* (2013.01)

(58) Field of Classification Search
CPC ...................................................... B23H 3/04
See application file for complete search history.

(56) References Cited

U.S. PATENT DOCUMENTS

| 4,250,011 A | 2/1981 | Capello et al. |
| 5,059,289 A | 10/1991 | Gaskell |
| 6,217,726 B1 * | 4/2001 | Lorincz ............... C25F 7/00 204/224 M |
| 6,387,242 B1 * | 5/2002 | Wei .................... B23H 9/00 204/224 M |
| 8,535,491 B2 | 9/2013 | Wei et al. |
| 9,192,999 B2 | 11/2015 | Carter et al. |

FOREIGN PATENT DOCUMENTS

| CN | 108637412 A | 10/2018 |
| DE | 102011100174 A1 | 11/2012 |
| WO | 2017218101 A1 | 12/2017 |
| WO | 2017220633 A1 | 12/2017 |

OTHER PUBLICATIONS

European Search Report dated Feb. 26, 2019 issued for corresponding European Patent Application No. 18201046.2.

* cited by examiner

*Primary Examiner* — Brian W Cohen
(74) *Attorney, Agent, or Firm* — Bachman & LaPointe, P.C.

(57) ABSTRACT

An electrochemical machining system comprises a component having a passage, the passage has an opening and an internal surface formed along the passage, a conductive wire has insulation covering portions of the conductive wire forming gaps having exposed wire; the conductive wire is inserted in the passage; a power source is coupled to the component and the conductive wire forms an electrical circuit, wherein the component comprises an anode and the conductive wire comprises a cathode; and an electrolyte within the passage contacting the internal surface and the exposed wire, wherein the electrolyte comprises a charge-carrying liquid configured to complete the electrical circuit between the cathode and anode.

15 Claims, 2 Drawing Sheets

METHOD FOR ELECTROCHEMICAL MACHINING OF COMPLEX INTERNAL ADDITIVELY MANUFACTURED SURFACES

BACKGROUND

The present disclosure is directed to electrochemical machining (ECM) and, more particularly, to an ECM system for use with additively manufactured components and methods of operation thereof.

Additive manufacturing is a technology that enables the "3D-printing" of components of various materials including metals and plastics. In additive manufacturing, a part is built in a layer-by-layer manner by leveling metal powder and selectively fusing the powder using a high-power laser. After each layer, more powder is added and the laser forms the next layer, simultaneously fusing it to the prior layers to fabricate a complete component buried in a powder bed. When removed from the powder bed, the component typically has a rough surface finish that must be improved via post-build processes such as grit blasting, grinding, sanding, or polishing to meet industry standards. These processes are known to improve surface finish for external easy-to-reach surfaces of the component, but are generally insufficient for internal passages that may be present. The surface finish of internal passages must be improved to mitigate component failures due to conditions such as low-cycle fatigue, high-cycle fatigue, and coking.

ECM is a method for improving surface finish. Due to the high metal removal rates of ECM, sufficient smoothing of surface finishes may be achieved without thermal or mechanical stresses being transferred to the component. In the ECM process, a cathode, or tool, is advanced toward an anode, or workpiece, typically the component. As an electrical potential difference is established between the between cathode and the anode, material from the anode is dissolved and electrolytic fluid carries away the dissolved metal compounds formed in the process. ECM can be applied to the internal surfaces of an additively manufactured component. However, the complex geometry of certain components prevents the cathode from gaining access to the internal surfaces to enable them to be machined. For example, internal passages may be larger than access ports that lead to the passages, thus requiring complex movement of the cathode. Additionally, the passages may twist and turn through a complex path, requiring a flexible cathode. Furthermore, the cathode must be electrically isolated from the component to prevent a short circuit and thus ensure successful surface finish enhancement of the internal passages using the ECM process.

SUMMARY

In accordance with the present disclosure, there is provided an electrochemical machining system comprising a component having a passage, the passage having an opening and an internal surface formed along the passage; a conductive wire having insulation covering portions of the conductive wire forming gaps having exposed wire, the conductive wire being inserted in the passage; a power source coupled to the component and the conductive wire forming an electrical circuit, wherein the component comprises an anode and the conductive wire comprises a cathode; and an electrolyte within the passage contacting the internal surface and the exposed wire, wherein the electrolyte comprises a charge-carrying liquid configured to complete the electrical circuit between the cathode and anode.

In another and alternative embodiment, the system further comprises an electrolyte plug coupled to the passage opening, the electrolyte plug having a wire port and an electrolyte port.

In another and alternative embodiment, the wire port is configured to pass the wire through the electrolyte plug while preventing electrolyte leakage past the electrolyte plug.

In another and alternative embodiment, the electrolyte port is configured to flow the electrolyte through the electrolyte plug and prevent leakage of the electrolyte.

In another and alternative embodiment, the system further comprises a spacer coupled to the wire proximate the insulation, the spacer being configured to prevent the wire from touching the internal surface of the passage to prevent a short circuit.

In another and alternative embodiment, the system further comprises a feed device coupled to the wire, the feed device being configured to move the wire both forward and backward.

In another and alternative embodiment, the power source comprises at least one of a potentiostat and a galvanostat.

In accordance with the present disclosure, there is provided an electrochemical machining system comprising a component having a passage, the passage having an opening and an internal surface formed along the passage; a conductive wire having insulation covering portions of the conductive wire forming gaps having exposed wire, the conductive wire being inserted in the passage; a power source coupled to the component and the conductive wire forming an electrical circuit, wherein the component comprises an anode and the conductive wire comprises a cathode; a spacer coupled to the wire proximate the insulation, the spacer being configured to prevent the wire from contacting the internal surface of the passage to prevent a short circuit; and an electrolyte within the passage contacting the internal surface and the exposed wire, wherein the electrolyte comprises a charge-carrying liquid configured to complete the electrical circuit between the cathode and anode.

In another and alternative embodiment, the spacer comprises a body having a bore and a standoff coupled to the body, the standoff configured to contact the internal surface and configured to centrally locate the wire within the internal passage.

In another and alternative embodiment, the spacer comprises an electrically conductive disk in electrical contact with the wire and located within the body insulated from direct contact with the internal surface.

In another and alternative embodiment, the standoff comprises at least one spring element having a predetermined thickness, amplitude, and deflection, configured to centrally locate the wire within the internal passage.

In another and alternative embodiment, the electrochemical machining system further comprises an electrolyte supply coupled to the passage through an electrolyte plug coupled to the opening of the passage.

In another and alternative embodiment, the electrochemical machining system further comprises at least one electrochemically active region proximate the wire and the internal surface of the passage.

In accordance with the present disclosure, there is provided a process for electrochemical machining an additively manufactured component with a passage, the process comprising inserting a conductive wire into the passage, the conductive wire having insulation covering portions of the conductive wire forming gaps having exposed wire; inserting an electrolyte into the passage, wherein the electrolyte contacts the exposed wire and an internal surface of the passage; creating an electrical circuit between the wire and the internal surface of the passage, wherein the internal surface is an anode and the wire is a cathode; and forming at least one electrochemically active region proximate the exposed wire and the internal surface of the passage In another and alternative embodiment, the process further comprises preventing the exposed wire from contacting the internal surface, by use of at least one spacer coupled to the wire.

In another and alternative embodiment, the spacer comprises a body having a bore and a standoff coupled to the body, the standoff configured to contact the internal surface and configured to centrally locate the wire within the internal passage.

In another and alternative embodiment, the spacer comprises an electrically conductive disk in electrical contact with the wire and is located within the body insulated from direct contact with the internal surface.

In another and alternative embodiment, the process further comprises moving the at least one electrochemically active region along the passage with a feed device coupled to the wire, the feed device being configured to move the wire both forward and backward.

In another and alternative embodiment, the process further comprises moving the wire back and forth to overcome stagnation and diffusion limitation in the electrolyte that fills the passage; creating turbulence in the liquid electrolyte wherein the turbulence increases electrochemical kinetics; and causing material to be removed from the internal surface.

In another and alternative embodiment, the process further comprises utilizing an additional wire to form an additional electrochemically active region; and overlapping the at least one electrochemically active region with the additional electrochemically active region.

Other details of the electrochemical machining process and apparatus are set forth in the following detailed description and the accompanying drawings wherein like reference numerals depict like elements.

DETAILED DESCRIPTION

Figure 1:
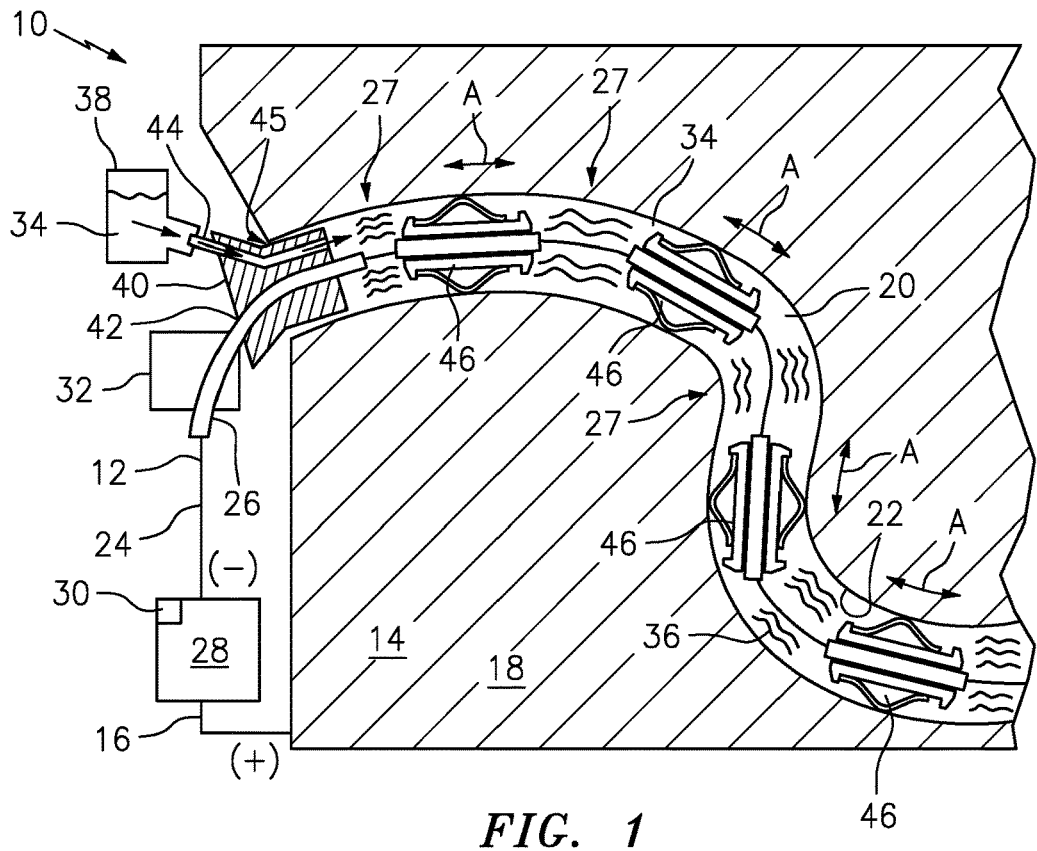
FIG. 1 is a schematic representation of an exemplary electrochemical machining device used with an additively manufactured component.

Referring now to FIG. 1, there is illustrated an electrochemical machining system 10 for an electrochemical machining process. The electrochemical machining system 10 includes a cathode 12 and an anode 14 electrically coupled to form an electrical circuit 16.

A component 18 can be formed with an internal passage 20 by additive manufacturing methods. The passage 20 can include a bore, channel, tube, lattice and the like. The passage 20 has an internal surface 22. The passage 20 can be configured in a serpentine, non-linear, arrangement having bends and turns in exemplary embodiments. The internal surface 22 can be inaccessible to line-of-sight mechanical machining processes. The component 18 is configured as the anode 14 in the electrochemical machining system 10 discussed herein.

A wire 24 having periodic insulation 26 with gaps 27 can be configured as the cathode 12 in the exemplary electrochemical machining system 10. The wire 24 can be configured to conduct electrical current in the electrical circuit 16. The wire 24 can be coupled to an electrical power source 28. The electrical power source 28 can include a potentiostat or galvanostat. A controller 30 can be coupled to the electrical power source 28 and configured to control the electrical current in the electrical circuit 16.

A feed device 32 can be coupled to the wire 24 and configured to move the wire 24 both forward and backward as needed. The feed device 32 can move the wire 24 back-and-forth inside the passage 20. The feed device 32 can also move the wire 24 in an indexed fashion to systematically expose all of the internal surface 22 to the wire 24 and resultant electrochemical activity for complete electrochemical machining along the entire passage 20. Small regions of the internal surface 22 are electrochemically active at any given time. These are the surfaces immediately adjacent to the small gaps 27 in wire insulation 26. By withdrawing (or inserting) the wire 24, electrochemically active regions or active surface regions 36 move in tandem with the gaps 27 in the insulation 26 causing the entire internal surface 22 of the passage 20 to be machined. In order to achieve the complete effect, the wire 24 can be withdrawn a minimum length equal to the spacing between insulation gaps 27. Withdrawing the wire 24 an additional amount will cause overlap between areas of activity of the electrochemically active regions 36 and will further machine the internal surface 22. The wire 24 may be re-inserted and withdrawn multiple times to repeatedly machine regions of the component's internal passage 20.

An electrolyte 34 is inserted into the passage 20 surrounding the cathode 12 and in contact with the internal surface 22. In exemplary embodiment, the liquid electrolyte 34 is periodically replaced to help maximize the electrochemical machining reactions. The electrolyte 34 can include a charge-carrying fluid that is configured to complete the electrical circuit 16 between the cathode 12 and anode 14. The wire 24 acting as the cathode 14 and the internal surface 22, acting as the anode 14, electrically couple through the electrolyte 34 to produce electrochemical reactions in electrochemically active regions 36 (shown as wavy lines in FIG. 1). These electrochemical reactions are reduction reactions occurring in the electrolyte at the bare cathode wire 24 at the periodic insulation gaps 27. Metal oxidation of the internal surface 22 (anode 14) occurs in close physical proximity to the gaps 27 in the insulation 26, as depicted. The oxidation of the component 18 serves to electrochemically machine the internal surface 22 and improve the surface finish. In an exemplary embodiment, the electrolyte 34 can comprise phosphoric acid. In an exemplary embodiment, the electrolyte can comprise a composition of 15% to 20% sulphuric acid and 25% to 60% and phosphoric acid. The electrolyte 34 can be supplied from an electrolyte supply 38. The electrolyte supply 38 can be coupled to the passage 20 through an electrolyte plug 40.

The electrolyte plug 40 can be configured to include a wire port 42 and an electrolyte port 44. The wire port 42 can be configured to pass the wire 24 through the electrolyte plug 40 while sealing and preventing electrolyte 34 leakage past the electrolyte plug 40. The electrolyte port 44 can be configured to flow electrolyte 34 through the electrolyte plug 40 and prevent leakage of electrolyte 34. The electrolyte plug 40 can be configured to insert into or otherwise operatively couple to an opening 45 of the passage 20 to allow for electrolyte 34 supply/flow and the wire 24 to pass through while preventing electrolyte 34 leakage out of the opening 45 of the passage 20. The electrolyte 34 can be periodically replaced with fresh electrolyte 34 through use of the electrolyte plug 40. The electrolyte plug 40 wire port 42 and/or electrolyte port 44 can include a gate or door that is operable to receive the wire 24 or electrolyte 34 for insertion into or removal from the passage 20.

In an exemplary embodiment, the electrolyte 34 may be held into place in the passage 20 by use of a vacuum, creating a static pressure in the electrolyte 34 that is less than atmospheric pressure and thus, contain the electrolyte 34 with atmospheric air pressure to prevent electrolyte 34 leakage through the opening 45 of the passage 20. The vacuum can be created at a portion of the passage 20 distal from the opening 45 by conventional means.

In another exemplary embodiment, the electrolyte plug 40 can comprise a membrane material that allows the wire 24 to pass through while sealing off the opening 45 of the passage 20 from electrolyte 34 leakage.

In order to overcome the stagnation and diffusion limitation in the electrolyte 34 that fills the passage 20, the wire 24 can be pulsed, vibrated, agitated, or otherwise moved back and forth (as shown by two headed arrows A in FIG. 1) along its length directions by the feed device 32. The discrete change in thickness between insulated and uninsulated regions of the wire 24 will create turbulence in the liquid electrolyte 34. This agitation will speed up the electrochemical kinetics and cause material to be removed rapidly and at a pace sustained over time.

An insulation spacer fitting, or simply a spacer 46 is coupled to the wire 24. The spacer 46 attaches over the insulation 26 or directly over the bare wire 24 and prevents the wire 24 from touching the internal surface 22 of the passage 20 to prevent short circuits. The spacer 46 maintains the wire 24 in a position near the center of the passage cross section. The spacer 46 is configured to slide along the passage 20 as the wire 24 is moved through the passage 20. Portions of the spacer 46 can be composed of an electrically insulating material in order to prevent a short circuit between cathode and anode.

Figure 2:
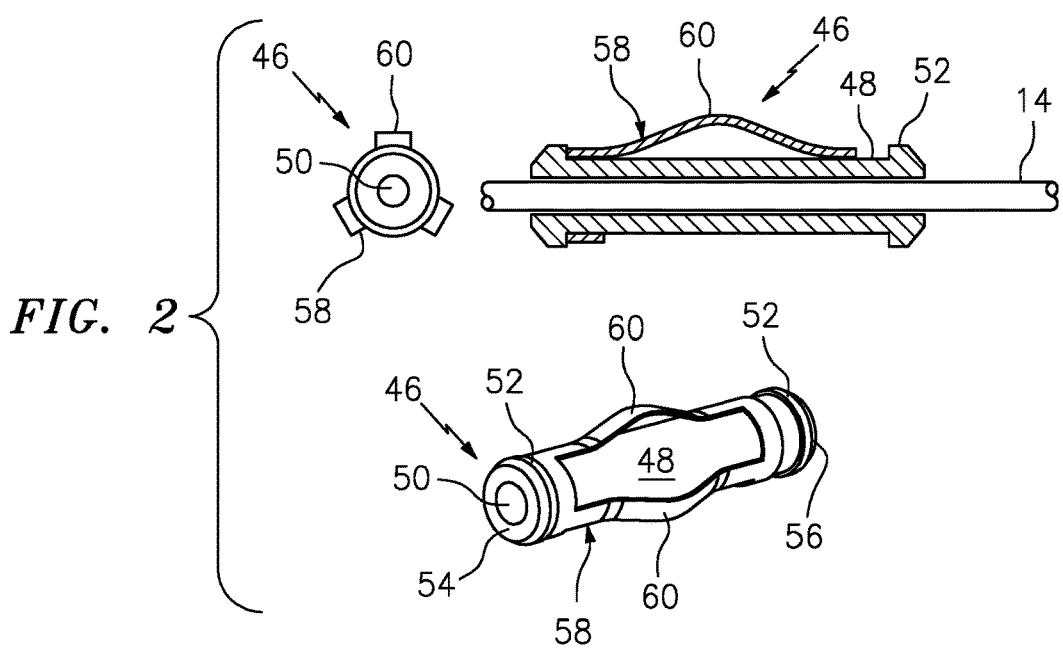
FIG. 2 is a multi-view illustration of an exemplary insulation spacer fitting.
Figure 3:
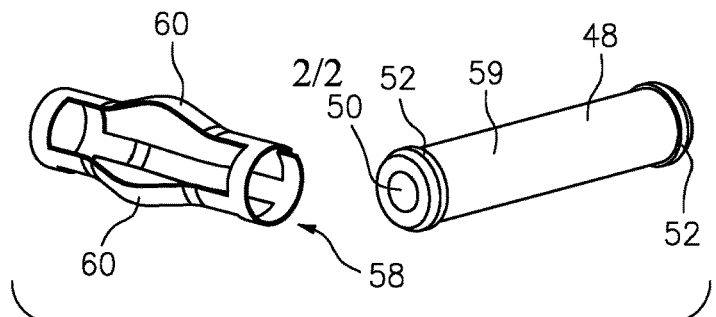
FIG. 3 is a multi-view illustration of an exemplary insulation spacer fitting.
Figure 4:
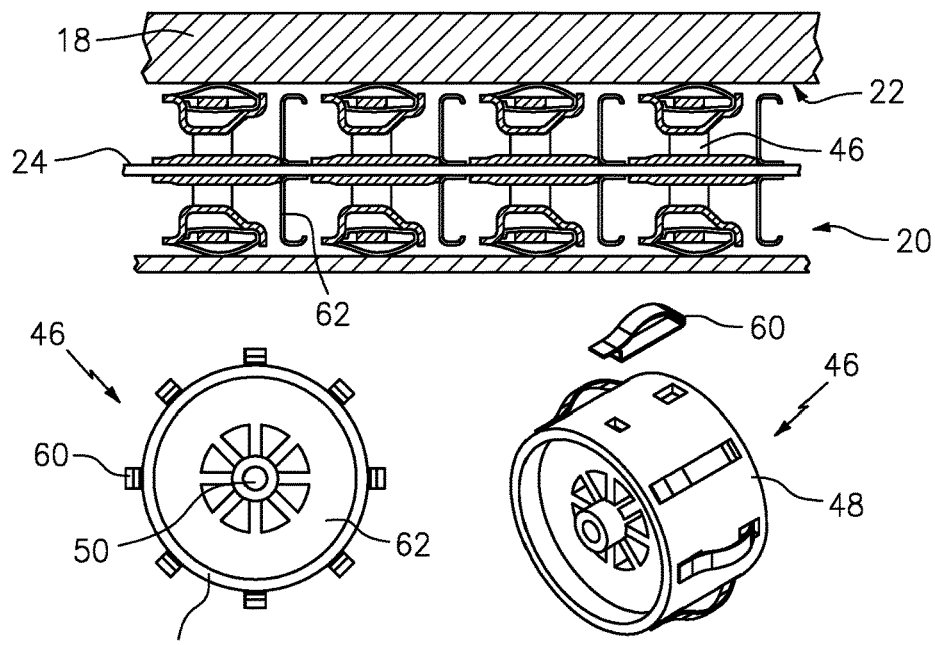
FIG. 4 is a multi-view illustration of an exemplary insulation spacer fitting.

Referring also to FIGS. 2, 3, and 4 exemplary embodiments of the spacer 46 are shown. The spacer 46 can include a body 48 that includes a bore 50 configured to fit over the outside of the insulation 26 of the wire 24 or directly over the wire 24. The body 48 can be made of electrically insulating material and supplement or supplant the insulation 26 over the wire 24. The body 48 can be a cylinder, tube, pipe shape, and the like. The body 48 can include flanges 52 on opposing ends 54, 56. At least one standoff 58 can be coupled to the body 48 at an exterior surface 59 opposite the bore 50. The standoff 58 can be configured to extend beyond the diameter of the flanges 52 and contact the internal surface 22 keeping the body 48 and resultantly the wire 24 away from contacting the internal surface 22 of the passage 20. The standoff 58 can include spring elements 60, for example in the form of wave springs. The thickness, amplitude, and deflection of the spring elements 60 can be predetermined. In an exemplary embodiment, the spring elements 60 include a tri-lobe configuration. The spring elements 60 maintain the wire 24 centrally located within the passage 20. The apex of the spring elements 60 can be a sliding contact point for the standoff 58. In an exemplary embodiment, the spring elements 60 can comprise a stainless steel or a nickel alloy material selected for corrosion and abrasion resistance.

In another exemplary embodiment, referring also to FIG. 4, the spacer 46 can be configured for a large bore passage 22. The spacer 46 can include an electrically conductive disk 62 in electrical contact with the wire 24 and within the body 48, so as to be insulated from contact with the internal surface 22. The conductive wire 24 is connected to the electrically conductive disks 62. The disks 62 can be configured as stamped sheet metal disks 62. Non-conductive body portions 48 support the springs 60. The wave springs 60 can be configured to as sliding feet and centering mechanism for the body 48 surrounding the disks 62. The conductive disks 62 extend the electrochemically active regions 36 away from the wire 24 toward a location more proximate the internal surface 22. The disks 62 allow for use of the system 10 in larger internal diameter passages 20. Liquid electrolyte 34 can be in contact with the conductive disks 62 and internal surface 22 with a relatively short and unimpeded pathway for ionic transport.

Figure 5:
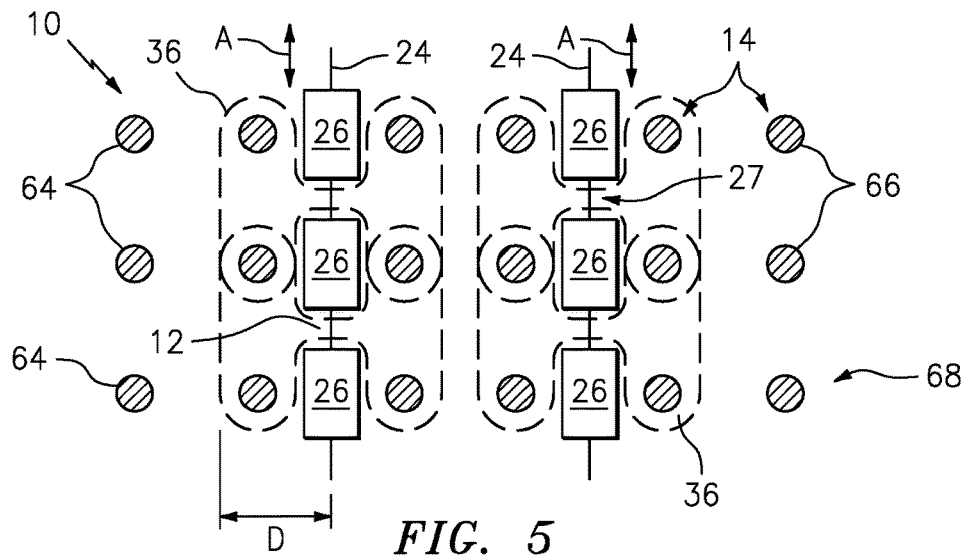
FIG. 5 is a schematic representation of an exemplary electrochemical machining device used with an additively manufactured component.

FIG. 5 illustrates an exemplary electrochemical machining device 10 used with an additively manufactured component 18. In the embodiment shown at FIG. 5, the component 18 can include an open lattice structure 64. The lattice structure 64 can be composed of cylindrical ligaments 66 meeting at node points 68. FIG. 5 depicts a cross section of the lattice structure where circles are formed by a cross sectional view of cylindrical lattice ligaments. The rough surface may be observed on the horizontal ligaments 66. The system 10 can be arranged with the cathode 12 surface close to the component 18 anodic surface 14. The wire(s) 24 including gaps 27 in the insulation 26 corresponding to the size of the lattice unit cell 64. The insulated portion 26 of the wire 24 can rest on lattice ligaments 66, while the bare wire 24 is exposed between ligaments 66 to prevent electrical shorts. The electrochemically active regions 36 extend (in 3D) around the bare wire 24 to a predetermined distance D. In an exemplary embodiment the predetermined distance D can be 3-4 millimeters which can be estimated as a maximum effective anode-cathode separation distance, as depicted in FIG. 5, shown in 2 dimensions. Multiple wires 24 can provide overlapping electrochemically active regions 36 to simultaneously finish many portions of the lattice structure 64. A similar use of multiple wires 24 can be utilized on other component 18 features, such as in passages 20, empty voids and the like.

The disclosed system 10 enables cost-effective surface finishing of internal features of additively manufactured parts. The problem of finishing internal surfaces can be adequately resolved by use of the system 10 to fully leverage the design freedom enabled by additive manufacturing.

The advantage of using a wire cathode is flexibility. A wire is available in varying thicknesses tailored to the application and can be threaded into intricate and otherwise inaccessible internal locations.

The periodic insulation gaps provide electrochemical activity, and since most of the wire is insulated a solution for the critical issue of maintaining electrical isolation between the part and the wire is accomplished by the disclosed system.

There has been provided an electrochemical machining process and apparatus. While the electrochemical machining process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An electrochemical machining system comprising:
   a component having a passage, said passage having an opening and an internal surface formed along said passage;
   a conductive wire having insulation covering portions of said conductive wire forming gaps having exposed wire, said conductive wire being inserted in said passage;
   a power source coupled to said component and said conductive wire forming an electrical circuit, wherein said component comprises an anode and said conductive wire comprises a cathode;
   a spacer coupled to said wire proximate said insulation, the spacer being configured to prevent the wire from touching the internal surface of the passage to prevent a short circuit, wherein said spacer comprises a body having a bore and a standoff coupled to said body, said standoff configured to contact said internal surface and configured to centrally locate said wire within the internal passage; and
   an electrolyte within said passage contacting said internal surface and said exposed wire, wherein the electrolyte comprises a charge-carrying liquid configured to complete the electrical circuit between the cathode and anode.

2. The system according to claim 1, further comprising an electrolyte plug coupled to said passage opening, said electrolyte plug having a wire port and an electrolyte port.

3. The system according to claim 2, wherein said wire port is configured to pass the wire through the electrolyte plug while preventing electrolyte leakage past the electrolyte plug.

4. The system according to claim 2, wherein the electrolyte port is configured to flow the electrolyte through the electrolyte plug and prevent leakage of the electrolyte.

5. The system according to claim 1, further comprising:
   a feed device coupled to the wire, the feed device being configured to move the wire both forward and backward.

6. The system according to claim 1, wherein said power source comprises at least one of a potentiostat and a galvanostat.

7. The electrochemical machining system according to claim 1, wherein said spacer comprises an electrically conductive disk in electrical contact with the wire and located within the body insulated from direct contact with the internal surface.

8. The electrochemical machining system according to claim 1, wherein said standoff comprises at least one spring element having a predetermined thickness, amplitude, and deflection, configured to centrally locate the wire within the internal passage.

9. The electrochemical machining system according to claim 1, further comprising:
   an electrolyte supply coupled to the passage through an electrolyte plug coupled to the opening of the passage.

10. The electrochemical machining system according to claim 1, further comprising:
    at least one electrochemically active region proximate the wire and the internal surface of the passage.

11. A process for electrochemical machining an additively manufactured component with a passage, said process comprising:
    inserting a conductive wire into the passage, the conductive wire having insulation covering portions of the conductive wire forming gaps having exposed wire;
    inserting an electrolyte into the passage, wherein the electrolyte contacts the exposed wire and an internal surface of the passage;
    preventing the exposed wire from contacting the internal surface, by use of at least one spacer coupled to the wire, wherein said spacer comprises a body having a bore and a standoff coupled to said body, said standoff configured to contact said internal surface and configured to centrally locate said wire within the internal passage;
    creating an electrical circuit between the wire and the internal surface of the passage, wherein the internal surface is an anode and the wire is a cathode; and
    forming at least one electrochemically active region proximate the exposed wire and the internal surface of the passage.

12. The process of claim 11, wherein said spacer comprises an electrically conductive disk in electrical contact with the wire and is located within the body insulated from direct contact with the internal surface.

13. The process of claim 11, further comprising:
    moving the at least one electrochemically active region along the passage with a feed device coupled to the wire, the feed device being configured to move the wire both forward and backward.

14. The process of claim 11, further comprising:
    moving the wire back and forth to overcome stagnation and diffusion limitation in the electrolyte that fills the passage;
    creating turbulence in the liquid electrolyte wherein the turbulence increases electrochemical kinetics; and
    causing material to be removed from the internal surface.

15. The process of claim 13, further comprising:
    utilizing an additional wire to form an additional electrochemically active region; and
    overlapping said at least one electrochemically active region with said additional electrochemically active region.

* * * * *